United States Patent
Cheng

(10) Patent No.: US 12,199,658 B2
(45) Date of Patent: Jan. 14, 2025

(54) COMMUNICATION CIRCUIT AND COMMUNICATION DEVICE

(71) Applicant: ZTE Corporation, Shenzhen (CN)

(72) Inventor: Shougang Cheng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 341 days.

(21) Appl. No.: 17/613,809

(22) PCT Filed: Jul. 9, 2020

(86) PCT No.: PCT/CN2020/100988
§ 371 (c)(1),
(2) Date: Nov. 23, 2021

(87) PCT Pub. No.: WO2021/051967
PCT Pub. Date: Mar. 25, 2021

(65) Prior Publication Data
US 2022/0231722 A1    Jul. 21, 2022

(30) Foreign Application Priority Data
Sep. 19, 2019  (CN) .......................... 201910888490.6

(51) Int. Cl.
*H04B 1/40*   (2015.01)
*H04B 1/00*   (2006.01)
(Continued)

(52) U.S. Cl.
CPC ............... *H04B 1/40* (2013.01); *H04B 1/005* (2013.01); *H04W 88/06* (2013.01)

(58) Field of Classification Search
None
See application file for complete search history.

(56) References Cited

U.S. PATENT DOCUMENTS 8,320,864 B2 * 11/2012 Fanous ................ H03G 1/0029
455/341
9,178,669 B2 * 11/2015 Fernando ................. H04B 7/08
(Continued)

FOREIGN PATENT DOCUMENTS

CN        101217719 A     7/2008
CN        101425816 A     5/2009
(Continued)

OTHER PUBLICATIONS

The State Intellectual Property Office of People's Republic of China. First Office Action for CN Application No. 2019108884906 and English translation, mailed Dec. 30, 2022, pp. 1-10.
(Continued)

*Primary Examiner* — Pablo N Tran
(74) *Attorney, Agent, or Firm* — Vivacqua Crane, PLLC

(57) ABSTRACT

Disclosed are a communication circuit and a communication device. The communication circuit comprises a signal reception multiplexing circuit comprising a multiplexing antenna, a signal separation module connected to the multiplexing antenna, and a first signal demodulation module and a second signal demodulation module respectively connected to the signal separation module. The multiplexing antenna is configured to receive a first signal and a second signal of the same frequency band and to send the signals received to the signal separation module. The signal separation module is configured to separate the first signal and the second signal from the signals received, to send the first signal separated to the first signal demodulation module for demodulation processing, and to send the second signal separated to the second signal demodulation module for demodulation processing.

11 Claims, 5 Drawing Sheets

351: 5G signal demodulation module
352: 4G signal demodulation module

(51) Int. Cl.
*H04B 1/04* (2006.01)
*H04W 4/00* (2018.01)
*H04W 88/06* (2009.01)

(56) References Cited

U.S. PATENT DOCUMENTS

| | | | |
|---|---|---|---|
| 11,038,728 B1* | 6/2021 | Hastings | H04L 27/144 |
| 2007/0025691 A1* | 2/2007 | Shoji | H04N 21/4821 |
| | | | 348/E7.039 |
| 2010/0220636 A1* | 9/2010 | Chan | H04B 1/0057 |
| | | | 370/277 |
| 2011/0122929 A1* | 5/2011 | Razzell | H04B 1/7183 |
| | | | 375/354 |
| 2012/0202561 A1* | 8/2012 | Robinett | H04B 1/006 |
| | | | 455/552.1 |
| 2013/0015998 A1* | 1/2013 | Jones | H04B 1/406 |
| | | | 342/30 |
| 2014/0003300 A1 | 1/2014 | Weissman et al. | |
| 2015/0244404 A1* | 8/2015 | Liu | H04B 1/006 |
| | | | 455/234.1 |
| 2015/0244548 A1 | 8/2015 | Weissman et al. | |
| 2015/0303951 A1 | 10/2015 | Zhou et al. | |
| 2015/0349722 A1* | 12/2015 | Wang | H04B 1/40 |
| | | | 330/295 |
| 2017/0346506 A1* | 11/2017 | Perumana | H04B 1/0458 |
| 2019/0158134 A1* | 5/2019 | Espana Fresno | G01R 23/175 |

FOREIGN PATENT DOCUMENTS

| | | |
|---|---|---|
| CN | 101583206 A | 11/2009 |
| CN | 102291157 A | 12/2011 |
| CN | 105978579 A | 9/2016 |
| CN | 106330248 A | 1/2017 |
| CN | 106533518 A | 3/2017 |
| CN | 109981119 A * | 7/2019 |

OTHER PUBLICATIONS

The State Intellectual Property Office of People's Republic of China. First Search Report for CN Application No. 2019108884906 and English translation, mailed Dec. 22, 2022, pp. 1-6.
International Searching Authority. International Search Report and Written Opinion for PCT Application No. PCT/CN2020/100988 and English translation, mailed Sep. 28, 2021, pp. 1-9.
Qualcomm Incorporated. Candidate NR Multiple Access Schemes, Apr. 2016, pp. 1-8, Busan, Korea.
European Patent Office. Extended European Search Report for EP Application No. 20866605.7, mailed Aug. 9, 2022, pp. 1-8.

* cited by examiner

351: 5G signal demodulation module

352: 4G signal demodulation module

551: 5G signal demodulation module

552: 4G signal demodulation module

651: 5G signal demodulation module 651

652: 4G signal demodulation module 652

COMMUNICATION CIRCUIT AND COMMUNICATION DEVICE

CROSS-REFERENCE TO RELATED APPLICATION

This application is a national stage filing under 35 U.S.C. § 371 of international application number PCT/CN2020/100988, filed Jul. 9, 2020, which claims priority to Chinese patent application No. 201910888490.6, filed Sep. 19, 2019. The contents of these applications are incorporated herein by reference in their entireties.

TECHNICAL FIELD

The present disclosure relates to the field of communication, for example, to a communication circuit and a communication device.

BACKGROUND

The 5th generation mobile communication system new radio (5G NR) has two operation modes, one is stand-alone (SA) mode without 4G assistance, and the other is non-SA mode with 4G signaling assistance. No matter which mode is employed, 3G and 4G are standard configurations on mobile terminals. Therefore, 5G terminals are bound to coexist with 3G, 4G, and even 2G that has not been completely eliminated. According to a frequency band planning proposed by the 3rd generation partnership project (3GPP), 5G includes sub 6G and millimeter wave spectrum resources, where sub 6G is distributed below 6 GHz. For the sake of saving money and spectrum multiplexing, some operators intend to share spectrum resources between long term evolution (LTE) and 5G. For example, LTE band 41 and 5G N41 share the spectrum of 2496~2690 MHz. However, the 5G modules introduced by chip solution manufacturers are relatively independent of 4G modules, so there is a need to add more circuits and antennas to support both 4G and 5G systems.

4G and 5G circuits are independent of each other, which will occupy more additional circuit area for a mobile terminal with a precious small size. Moreover, when 4G and 5G antennas support 4×4 multiple input multiple output (MIMO) respectively, there are a large number of antennas on a mobile phone. In related art, the number of antennas on the terminal is reduced by sharing some antennas, thereby simplifying the antenna layout and wiring on the terminal. However, antenna combining by filter alone has a great loss on the path.

SUMMARY

In order to at least solve the problems of complicated circuit layout and large number of antennas in the terminal device caused by the independence of 5G module and 4G module and more circuits and antennas to support both 4G and 5G systems, according to some embodiments of the present disclosure, a communication circuit and a communication device are provided.

According to some embodiments of the present disclosure, a communication circuit is provided, including a signal reception multiplexing circuit including a multiplexing antenna, a signal separation module connected to the multiplexing antenna, and a first signal demodulation module and a second signal demodulation module respectively connected to the signal separation module.

The multiplexing antenna is configured to receive a first signal and a second signal having the same frequency band and send the received signals to the signal separation module; and The signal separation module is configured to separate the first signal and the second signal from the received signals, send the separated first signal to the first signal demodulation module for demodulation processing, and send the separated second signal to the second signal demodulation module for demodulation processing.

According to some embodiments of the present disclosure, a communication device is further provided, including the communication circuit described above.

DETAILED DESCRIPTION

The present disclosure will be explained by the embodiments in conjunction with the drawings. The embodiments described herein are intended to explain and not to limit the present disclosure.

In the following description, suffixes such as "module", "component" or "unit" used to represent elements are for facilitating the description of the present disclosure, and have no specific meaning. Therefore, "module", "component" or "unit" can be mixed in used.

A terminal device can be implemented in various forms. For example, the terminal device described in the present disclosure may include a mobile terminal such as a mobile phone, a tablet, a laptop, a handheld computer, a personal digital assistant (PDA), a portable media player (PMP), a navigation device, a wearable device, a smart bracelet, a pedometer, and a fixed terminal such as a digital television (TV), a desktop computer.

In the following description, a mobile terminal will be taken as an example. Except for the elements specified for mobile purposes, the configuration of the mobile terminal according to the embodiments of the present disclosure can also be applied to a fixed type of terminal devices.

Figure 1:
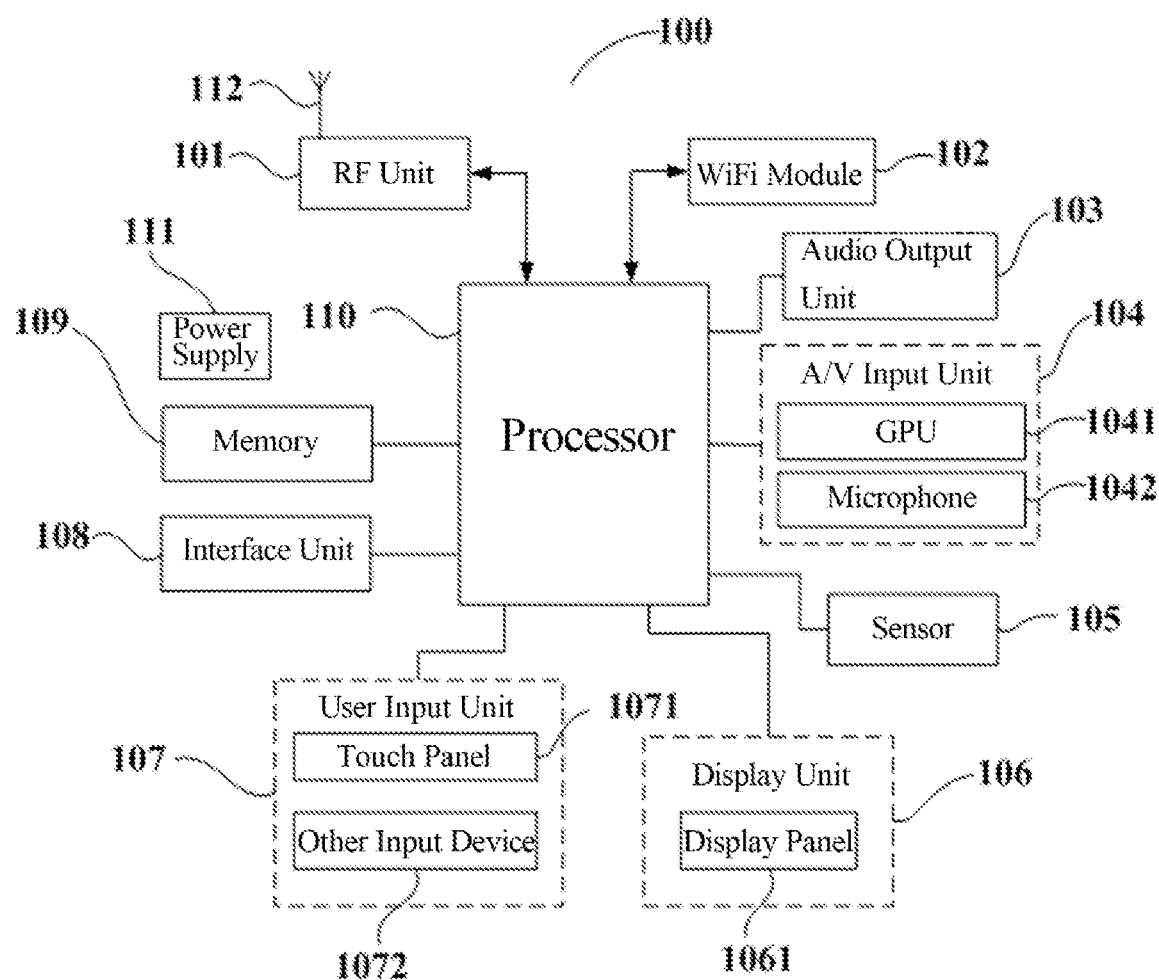
FIG. 1 is a schematic diagram of a hardware structure diagram of a mobile terminal according to an embodiment of the present disclosure.

FIG. 1 is a schematic diagram of a hardware structure of a mobile terminal according to an embodiment of the present disclosure. As shown in FIG. 1, the mobile terminal 100 may include a radio frequency (RF) unit 101, a Wi-Fi module 102, an audio output unit 103, an audio/video (A/V) input unit 104, a sensor 105, a display unit 106, a user input unit 107, an interface unit 108, a memory 109, a processor 110, a power supply 111, an antenna 112, etc. The mobile terminal 100 shown in FIG. 1 includes at least four groups of antennas 112. Among the at least four groups of antennas 112, antennas connected to a main transceiver channel of the mobile terminal 100 are main antennas, and antennas connected to an auxiliary receiver channel of the mobile terminal 100 are auxiliary antennas. The processor 110 is configured to control the connection and disconnection of each group of antennas with the main transceiver channel and the auxiliary receiver channel, respectively. When the processor 110 controls a group of antennas to connect to the main transceiver channel, the RF unit 101 can receive or transmit signals through the group of antennas. The at least four groups of antennas 112 can be flexibly arranged at any position of the mobile terminal 100. For example, when the mobile terminal 100 includes four groups of antennas 112, the four groups of antennas 112 can be respectively arranged at the upper, middle, lower left and lower right of the back of the mobile terminal 100. The mobile terminal structure shown in FIG. 1 does not constitute a limitation of the mobile terminal, and the mobile terminal may include more or less components than shown, or a combination of some components, or different component arrangements.

The components of the mobile terminal are described below with reference to FIG. 1.

The RF unit 101 can be configured to receive and transmit signals during transmitting and receiving information or calling. After downlink information from a base station is received, the processor 110 processes the downlink information. In addition, uplink data are sent to the base station. Generally, the RF unit 101 includes, but is not limited to, an antenna, at least one amplifier, a transceiver, a coupler, a low noise amplifier, a duplexer, and the like. In addition, the RF unit 101 are configured to communicate with a network and other devices through wireless communication as well. Any communication standards or protocols can be used for the above wireless communication, including but not limited to, global system of mobile communication (GSM), general packet radio service (GPRS), code division multiple access 2000 (CDMA2000), wideband code division multiple access (WCDMA), time division-synchronous code division multiple access (TD-SCDMA), frequency division duplexing-long term evolution, FDD-LTE) and time division duplexing-long term evolution (TDD-LTE), etc.

Wi-Fi is a short-distance wireless transmission technology. The mobile terminal can help users send and receive e-mails, browse web pages and access streaming media through the Wi-Fi module 102, which provides users with wireless broadband Internet access. Although a Wi-Fi module 102 is shown in FIG. 1, the Wi-Fi module 102 does not belong to a necessary component of the mobile terminal, and can be omitted as required without altering the essence of the present disclosure.

The audio output unit 103 is configured to convert audio data received by the RF unit 101 or the Wi-Fi module 102 or stored in the memory 109 into audio signals and output them as sounds when the mobile terminal 100 is in a call signal reception mode, a talk mode, a recording mode, a voice recognition mode, a broadcast reception mode, etc. Furthermore, the audio output unit 103 is further configured to provide audio outputs related to specific functions performed by the mobile terminal 100 (for example, call signal reception sound, message reception sound, etc.). The audio output unit 103 may include a speaker, a buzzer, and the like.

The A/V input unit 104 is configured to receive audio or video signals. The A/V input unit 104 may include a graphics processing unit (GPU) 1041 and a microphone 1042. The GPU 1041 processes image data of a static picture or video obtained by an image capture device (such as a camera) in a video capture mode or an image capture mode. The processed image frame may be displayed on the display unit 106. The image frame processed by the GPU 1041 can be stored in the memory 109 (or other storage medium) or transmitted via the RF unit 101 or the Wi-Fi module 102. The microphone 1042 is configured to receive sounds (audio data) via the microphone 1042 in an operation mode such as a telephone talk mode, a recording mode, a voice recognition mode, and the like, and can process such sounds into audio data. The processed audio (voice) data can be converted into a format output that can be transmitted to the mobile communication base station via the RF unit 101 in the telephone talk mode. The microphone 1042 can implement various types of noise elimination (or suppression) algorithms to eliminate (or suppress) noise or interference generated during receiving and transmitting of audio signals.

The mobile terminal 100 further includes at least one sensor 105, such as a light sensor, a motion sensor and other sensors. The light sensor includes an ambient light sensor and a proximity sensor. The ambient light sensor is configured to adjust the brightness of a display panel 1061 according to the brightness of ambient light, and the proximity sensor is configured to turn off the display panel 1061 and/or backlight when the mobile terminal 100 is moved to ears. As a kind of motion sensor, the accelerometer sensor is configured to detect the acceleration in multiple directions (generally triaxial), and detect the magnitude and direction of gravity at rest. The accelerometer sensor is configured to identify the application of mobile phone attitude (such as horizontal and vertical screen switching, related games, magnetometer attitude calibration), vibration recognition related functions (such as pedometer, knocking), etc. Other sensors such as a fingerprint sensor, a pressure sensor, an iris sensor, a molecular sensor, a gyroscope, a barometer, a hygrometer, a thermometer, an infrared sensor, etc., which can also be configured in the mobile phone, will not be described in detail here.

The display unit 106 is configured to display information input by a user or information provided to the user. The display unit 106 may include a display panel 1061, which may be configured in the form of a liquid crystal display (LCD), an organic light emitting diode (OLED), etc.

The user input unit 107 can be configured to receive input digital or character information and generate key signal input related to user settings and function control of the mobile terminal. The user input unit 107 may include a touch panel 1071 and other input devices 1072. The touch panel 1071, also known as a touch screen, is configured to collect the user's touch operations on or near the touch panel 1071 (such as the user's operations on or near the touch panel 1071 with a finger, a stylus or any other suitable objects or accessories), and drive the corresponding connecting means according to a preset program. The touch panel 1071 may include a touch detection means and a touch controller. The touch detection means is configured to detect the user's touch orientation, detect the signal brought by the touch operation, and transmit the signal to the touch controller. The touch controller receives touch information from the touch detection device, converts the touch information into contact coordinates, and sends the coordinates to the processor 110. Further, the touch controller is configured to receive and execute commands sent by the processor 110. In addition, the touch panel 1071 may be implemented as resistive, capacitive, infrared and surface acoustic wave touch panels, etc. In addition to the touch panel 1071, the user input unit 107 may also include other input devices 1072. Other input devices 1072 may include, but are not limited to, one or more of physical keyboard, function key (such as volume control key, switch key, etc.), trackball, mouse, joystick, etc., which are not limited here.

The touch panel 1071 is arranged to cover the display panel 1061. When a touch operation on or near the touch panel 1071 is detected, the touch operation is transmitted to the processor 110 to determine the type of touch event, and then the processor 110 provides corresponding visual output on the display panel 1061 according to the type of touch event. Although in FIG. 1, the touch panel 1071 and the display panel 1061 realize the input and output functions of the mobile terminal as two independent components, in some embodiments, the touch panel 1071 and the display panel 1061 can be integrated to realize the input and output functions of the mobile terminal, which is not limited here.

The interface unit 108 is configured to serve as an interface through which at least one external device can be connected to the mobile terminal 100. For example, the external device may include a wired or wireless headset port, an external power supply (or battery charger) port, a wired or wireless data port, a memory card port, a port configured to connect a device having an identification module, an audio input/output (I/O) port, a video I/O port, a headset port, and the like. The interface unit 108 can be configured to receive input (e.g., data information, power, etc.) from the external device and transmit the received input to one or more elements within the mobile terminal 100, or can be configured to transmit data between the mobile terminal 100 and the external device.

The memory 109 can be configured to store software programs and various data. The memory 109 may mainly include a program storage area and a data storage area. The program storage area may be configured to store an operating system, an application program required by at least one function (such as a sound playing function, an image playback function), etc. The data storage area may be configured to store data (such as audio data, phone book, etc.) created according to the use of the mobile phone. In addition, the memory 109 may include high-speed random access memory, and may also include a nonvolatile memory, such as at least one magnetic disk memory device, a flash memory device, or other volatile solid-state memory devices.

The processor 110 is a control center of the mobile terminal, which connects multiple parts of the whole mobile terminal using various interfaces and lines, executes various functions of the mobile terminal and processes data by running or executing software programs and/or modules stored in the memory 109 and invoking data stored in the memory 109, so as to carry out overall monitoring of the mobile terminal. The processor 110 may include one or more processing units. The processor 110 may integrate an application processor and a modem processor, where the application processor mainly processes the operating system, user interface and application programs, and the modem processor mainly processes wireless communication. It can be understood that the above modem processor may not be integrated into the processor 110.

The mobile terminal 100 may further include a power supply 111 (such as a battery) for supplying power to a plurality of components. The power supply 111 may be logically connected to the processor 110 through a power management system, so that functions such as charge and discharge management and power consumption management can be realized through the power management system.

Although not shown in FIG. 1, the mobile terminal 100 may also include a Bluetooth module, etc., which will not be described in detail here.

In order to facilitate understanding of the embodiments of the present disclosure, the communication network system on which the mobile terminal of the present disclosure is based will be described below.

Figure 2:
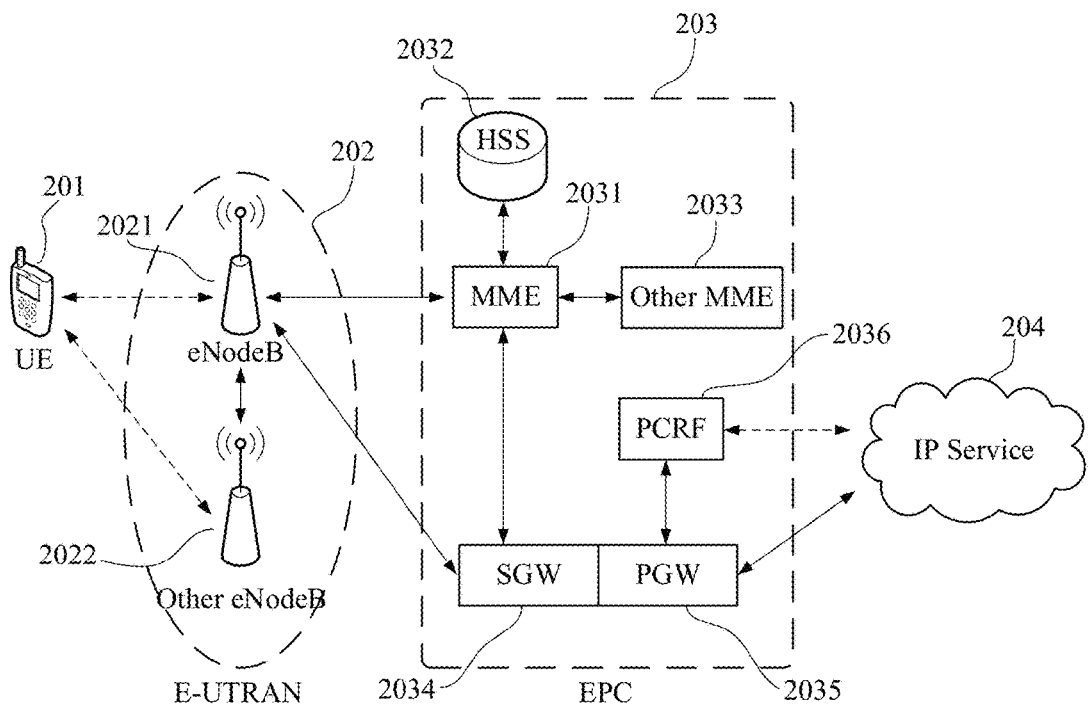
FIG. 2 is an architecture diagram of a communication network system according to an embodiment of the present disclosure.

FIG. 2 is an architecture diagram of a communication network system according to an embodiment of the present disclosure. As shown in FIG. 2, the communication network system is a LTE system of the universal mobile communication technology, and the LTE system includes a user equipment (UE) 201, an evolved universal mobile telecommunications system terrestrial radio access network (E-UTRAN) 202, an evolved packet core (EPC) 203 and an internet protocol (IP) service of operators 204, which are communicatively connected to each other in turn.

The UE 201 may be the above mobile terminal 100, which is not described in detail here.

The E-UTRAN 202 includes an evolved NodeB (eNodeB) 2021 and other eNodeBs 2022. The eNodeB 2021 can be connected to other eNodeBs 2022 through a backhaul (e.g., X2 interface). The eNodeB 2021 is connected to the EPC 203, and can provide access from the UE 201 to the EPC 203.

The EPC 203 may include a mobility management entity (MME) 2031, a home subscriber server (HSS) 2032, other MMES 2033, a serving gate way (SGW) 2034, a packet data network gate way (PGW) 2035 and a policy and charging rules function (PCRF) 2036. The MME 2031 is a control node that processes signaling between the UE 201 and the EPC 203, providing bearer and connection management. The HSS 2032 is configured to provide some registers such as home location registers (not shown) for describer management, and to store some subscriber specific information about service characteristics, data rate, etc. All subscriber data can be sent through the SGW 2034. The PGW 2035 can provide IP address allocation and other functions of the UE 201. The PCRF 2036 is a decision point for service data flow and IP Bearer resource policy and charging control policy, which selects and provides available policies and charging control decisions for a policy and charging execution function unit (not shown).

The IP service 204 may include internet, intranet, IP multimedia subsystem (IMS) or other IP services.

Although the LTE system is described above as an example, the present disclosure is not only applicable to LTE system, but also applicable to other wireless communication systems, such as GSM, CDMA2000, WCDMA, TD-SCDMA and future new network systems, etc., which is not limited here.

Based on the hardware structure of the mobile terminal and the communication network system described above, some embodiments of the present disclosure are illustrated.

Embodiment I

In order to at least partially solve the problems of complicated circuit layout and large number of antennas on the terminal caused by the independence of 5G module and 4G module and the need to add more circuits and antennas to support both 4G and 5G systems, according to some embodiments of the present disclosure, a communication circuit is provided.

For 5G millimeter wave frequency band, 5G RF circuit and antenna cannot be shared due to great difference between 5G operating frequency and 2G\3G\4G operating frequency, but for the sub 6G spectrum, a large part of 5G spectrum overlaps with 2G\3G\4G spectrum. In view of these possible frequency combinations, in order to solve the above technical problems, a communication circuit is provided, including a signal reception multiplexing circuit.

The signal reception multiplexing circuit includes a multiplexing antenna, a signal separation module connected to the multiplexing antenna, and a first signal demodulation module and a second signal demodulation module respectively connected to the signal separation module. The multiplexing antenna is configured to receive a first signal and a second signal having the same frequency band and send the received signals to the signal separation module, and the signal separation module is configured to separate the first signal and the second signal from the received signals, send the separated first signal to the first signal demodulation module for demodulation processing, and send the separated second signal to the second signal demodulation module for demodulation processing.

In an embodiment of the present disclosure, the first signal is a 5G signal, and the second signal is at least one of 2G, 3G and 4G signals having the same frequency band as the first signal. The signal separation module includes a power divider, which performs signal separation processing for the received signals to separate the first signal and the second signal from the received signals, and then distributes the separated first signal and second signal to the corresponding first signal demodulation module and second signal demodulation module for signal demodulation processing. In an embodiment of the present disclosure, the signal separation module is not limited to the power divider, and may also be any signal separation device that can perform signal separation processing on the signals to separate the first signal and the second signal from the signals. An appropriate signal separation module can be selected as required.

The signal reception multiplexing circuit further includes a filter processing module arranged between the multiplexing antenna and the signal separation module, and the filter processing module is configured to filter the signals received by the multiplexing antenna and send the filtered signals to the signal separation module.

In an embodiment of the present disclosure, the filter processing module includes a band-pass filter which performs band-pass filtering for the first signal and the second signal having the same frequency band received by the multiplexing antenna to suppress out-of-band noise. In an embodiment of the present disclosure, the filter processing module includes, but is not limited to, the band-pass filter, and may also be any appropriate filter processing module that can perform band-pass filtering for the received first signal and second signal. An appropriate filter processing module can be selected as required.

The signal reception multiplexing circuit also includes a low noise processing module arranged between the filter processing module and the signal separation module, and the low noise processing module is configured to amplify weak signals after filtering by the filter processing module.

In an embodiment of the present disclosure, the low noise processing module includes a low noise amplifier arranged between the filter processing module and the signal separation module, and the low noise processing module is configured to pre-amplify the weak signals after the first signal and the second signal received by the multiplexing antenna are filtered by the filter processing module, and can reduce the deterioration degree of signal-to-noise ratio caused by a post-stage signal separation module, so as to provide an appropriate gain for a post-stage signal amplification processing.

The signal receiving multiplexing circuit also includes a first signal amplification processing module arranged between the signal separation module and the first signal demodulation module, and a second signal amplification processing module arranged between the signal separation module and the second signal demodulation module.

In an embodiment of the present disclosure, the first signal amplification processing module and the second signal amplification processing module include an adjustable gain low noise amplifier. Since the amplitudes of the received 4G and 5G signals are different, it may need to separately perform adjustable gain amplification, so that the first signal and the second signal respectively amplified by the adjustable gain amplifier can reach specific amplitudes. Then, the subsequent signal demodulation processing is performed. In an embodiment of the present disclosure, the signal processing module also includes a mixer, which performs a frequency conversion processing for the signals reaching the specific amplitude after processed by the adjustable gain amplifier, generates a baseband signal after the frequency conversion processing, and sends the baseband signal to a non-demodulation unit for demodulation processing.

In an embodiment of the present disclosure, the communication circuit may also include a transmission antenna and a signal transmission processing circuit connected to the transmission antenna.

The transmission antenna includes a first signal transmission antenna and a second signal transmission antenna, and the signal transmission processing circuit includes a first signal transmission processing circuit and a second signal transmission processing circuit.

In an embodiment of the present disclosure, at least one transmission antenna and a signal transmission processing circuit connected to the transmission antenna may be included. When the signal reception multiplexing circuit includes one transmission antenna, the signal transmission antenna may be the first signal transmission antenna or the second signal transmission antenna.

In an embodiment of the present disclosure, in the signal reception multiplexing circuit, a multiplexing antenna in at least one signal reception multiplexing circuit is also connected to a signal transmission processing circuit and a duplexer, where the signal transmission processing circuit is connected to the multiplexing antenna through the duplexer and the signal separation module is connected to the multiplexing antenna through the duplexer; and the multiplexing antenna is configured to receive and transmit the first signal or the second signal.

In an embodiment of the present disclosure, the duplexer filters the received signal and the transmitted signal of the multiplexing antenna, respectively, transmits the received signal of the multiplexing antenna to the signal separation module after filtering, and transmits the transmitted signal to the multiplexing antenna after filtering.

In an example of the embodiment of the present disclosure, the signal reception multiplexing circuit includes two signal reception multiplexing circuits, and multiplexing antennas in the two signal reception multiplexing circuits are also connected to signal transmission processing circuits and duplexers, where one signal transmission processing circuit is a first signal transmission processing circuit and the other signal transmission processing circuit is a second signal transmission processing circuit.

In this example, the multiplexing antennas in the two signal reception multiplexing circuits are also connected to signal transmission processing circuits and duplexers, where the multiplexing antenna in one signal reception multiplexing circuit is configured to receive and transmit the first signal, and the multiplexing antenna in the other signal reception multiplexing circuit is configured to receive and transmit the second signal.

In another example of an embodiment of the present disclosure, the signal reception multiplexing circuit includes one signal reception multiplexing circuit, and a multiplexing antenna in the one signal reception multiplexing circuit is also connected to a signal transmission processing circuit and a duplexer, where the signal transmission processing circuit is a first signal transmission processing circuit. The communication circuit also includes a transmission antenna and a signal transmission processing circuit connected to the transmission antenna, where the signal transmission processing circuit is a second signal transmission processing circuit.

In this example, when a multiplexing antenna in one signal reception multiplexing circuit is also connected to a signal transmission processing circuit and a duplexer, the signal reception multiplexing circuit may be a first signal reception multiplexing circuit and the multiplexing antenna is configured to receive and transmit the first signal. Alternatively, the signal reception multiplexing circuit may be a second signal reception multiplexing circuit and the multiplexing antenna is configured to receive and transmit the second signal. The communication circuit also includes a transmission antenna which is configured to transmit the first signal or the second signal separately. When the signal reception multiplexing circuit is the first signal reception multiplexing circuit, the transmission antenna is the second signal transmission antenna and is configured to transmit the second signal separately. When the signal reception multiplexing circuit is the second signal reception multiplexing circuit, the transmission antenna is the first signal transmission antenna and is configured to transmit the first signal separately.

Figure 3:
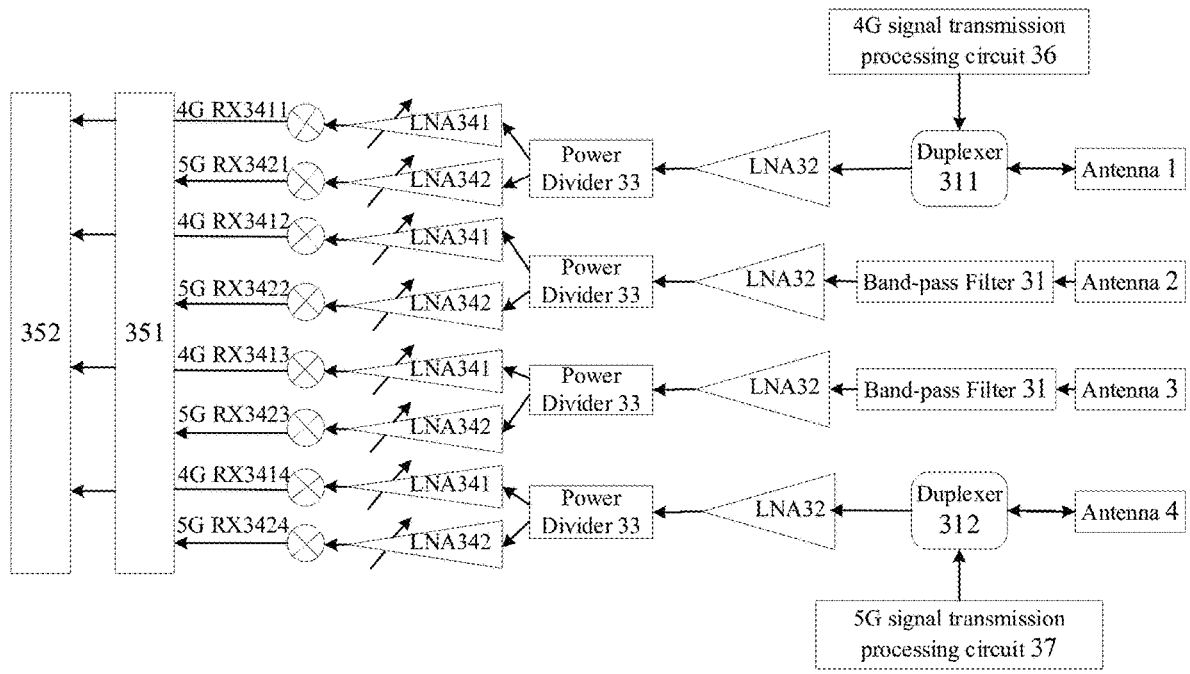
FIG. 3 is a schematic diagram of a communication circuit according to embodiment I of the present disclosure.

FIG. 3 is a schematic structural diagram of a communication circuit according to an embodiment of the present disclosure.

In an example, as shown in FIG. 3, the communication circuit is applicable to an FDD system. The communication circuit includes four groups of signal reception multiplexing circuits, which include antennas 1, 2, 3 and 4. The antennas 1, 2, 3 and 4 are configured to receive 5G signals and a second signal of the same frequency band sent by the base station, where the second signal includes at least one of 2G, 3G and 4G signals. In FIG. 3, the second signal being a 4G signal is taken as an example. The antenna 1 is also connected to a 4G signal transmission processing circuit 36 and a duplexer 311 and is configured to transmit 4G signals. The antenna 4 is also connected to a 5G signal transmission processing circuit 37 and a duplexer 312, and is configured to transmit 5G signals. When band-pass filters connected to antenna 2 and antenna 3 are replaced with duplexers, the 5G and 4G transmission signals can also be switched among the antennas 1, 2, 3 and 4, so the 5G and 4G transmission signals are not limited to the antennas 1 and 4. The 5G signal and 4G signal received by antennas 1-4 are filtered by the band-pass filter 31, the duplexer 311 and the duplexer 312, and then enter a low noise pre-amplifier 32 for pre-amplification, so as to amplify the weak signals received by antennas, provide appropriate gain and reduce the influence of post-stage power divider 33 on the signal-to-noise ratio of the signal path. The low noise pre-amplifier shall be a low noise amplifier with low noise figure (nf<1.0), high linearity and medium gain (gain 10~12 dB). The pre-amplified 4G and 5G received signals are separated from the received signals by the power divider 33, then distributed to the respective 4G signal adjustable gain amplifier 341 and 5G signal adjustable gain amplifier 342 for signal adjustable gain amplification, and then sent to a 4G signal demodulation module 351 and a 5G signal demodulation module 352 for signal demodulation processing after the signal amplitudes of 4G signal and 5G signal reach specific amplitudes. 4G receive (RX) 3411, 4G RX 3412, 4G RX 3413, 4G RX 3414, 5G RX 3421, 5G RX 3422, 5G RX 3423 and 5G RX 3424 represent four receiving links of the LTE system.

According to the embodiment of the present disclosure, the communication circuit includes at least one signal reception multiplexing circuit which includes a multiplexing antenna, a signal separation module connected to the multiplexing antenna, and a first signal demodulation module and a second signal demodulation module respectively connected to the signal separation module. The multiplexing antenna is configured to receive a first signal and a second signal having the same frequency band and send the received signals to the signal separation module. The signal separation module is configured to separate the first signal and the second signal from the received signal, send the separated first signal to the first signal demodulation module for demodulation processing, and send the separated second signal to the second signal demodulation module for demodulation processing. According to the embodiment of the present disclosure, the communication circuit integrates the receiving circuits and the antennas for the 4G and 5G signals of the same frequency band, to allow the downlink signals of 4G and 5G to share the antenna receiving and receiving amplification circuits, which solves the problems of crowded antenna space and larger circuit occupation area in the terminal, reduces the number of 4G 4×4MIMO+5G 4×4MIMO antennas from 8 to 4, greatly reduces the pressure of antenna layout, and reduces the number of antennas to help improve antenna performance. Using circuit multiplexing technology makes it possible to share antennas with the same frequency without deteriorating the noise figure of the link, which effectively reduces the layout size of 4G and 5G multimode products, simplifies the RF circuit design and antenna design and improves the user experience.

Embodiment II

Figure 4:
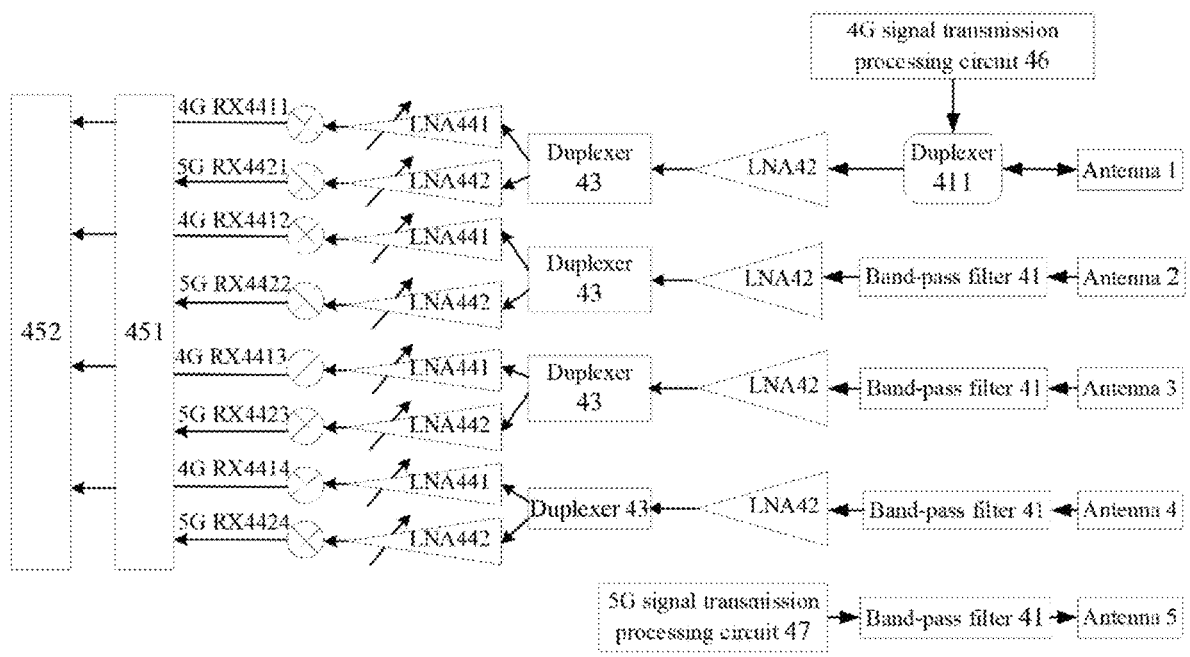
FIG. 4 is a schematic diagram of a communication circuit according to embodiment II of the present disclosure.

According to another embodiment of the present disclosure, a communication circuit applicable to the FDD system is provided, as shown in FIG. 4. The communication circuit includes four groups of signal reception multiplexing circuits, which include multiplexing antennas 1, 2, 3 and 4. The communication circuit also includes a transmission antenna 5 and a 5G signal transmission processing circuit 47 connected to the transmission antenna, where the transmission antenna is a transmission antenna for 5G signal and is configured to transmit 5G signals separately. The antennas 1, 2, 3 and 4 are configured to receive 5G signals and a second signal of the same frequency band sent by the base station, where the second signal includes at least one of 2G, 3G and 4G signals. In FIG. 4, the second signal being a 4G signal is taken as an example. The antenna 1 is also connected to a 4G signal transmission processing circuit 46 and a duplexer 411 and is configured to transmit 4G signals. When band-pass filters connected to the antennas 2, 3 and 4 are replaced with duplexers, the 4G transmission signals can also be switched among the antennas 1, 2, 3 and 4, so the 4G transmission signals are not limited to the antenna 1. The 5G 4G signals received by the antennas 1-4 are filtered by the band-pass filter 41 and the duplexer 411, and then enter a low noise pre-amplifier 42 for pre-amplification, so as to amplify the weak signals received by antennas, provide appropriate gain and reduce the influence of post-stage power divider 43 on the signal-to-noise ratio of the signal path. The low noise pre-amplifier shall be a low noise amplifier with low noise figure (nf<1.0), high linearity and medium gain (gain 10~12 dB). The pre-amplified 4G and 5G received signals are separated from the received signals by the power divider 43, then distributed to the respective 4G signal adjustable gain amplifier 441 and 5G signal adjustable gain amplifier 442 for signal adjustable gain amplification, and then sent to a 4G signal demodulation module 451 and a 5G signal demodulation module 452 for signal demodulation processing after the signal amplitudes of 4G signal and 5G signal reach specific amplitudes.

According to the embodiment of the present disclosure, the communication circuit includes at least one signal reception multiplexing circuit which includes a multiplexing antenna, a signal separation module connected to the multiplexing antenna, and a first signal demodulation module and a second signal demodulation module respectively connected to the signal separation module. The multiplexing antenna is configured to receive a first signal and a second signal having the same frequency band and send the received signals to the signal separation module. The signal separation module is configured to separate the first signal and the second signal from the received signal, send the separated first signal to the first signal demodulation module for demodulation processing, and send the separated second signal to the second signal demodulation module for demodulation processing. According to the embodiment of the present disclosure, the communication circuit integrates the receiving circuits and antennas for the 4G and 5G signals of the same frequency band, allowing the downlink signals of 4G and 5G to share the antenna receiving and receiving amplification circuits, which solves the problems of crowded antenna space and larger circuit occupation area in the terminal, reduces the number of 4G 4×4MIMO+5G 4×4MIMO antennas from 8 to 5, greatly reduces the pressure of antenna layout, and reduces the number of antennas to help improve antenna performance. Using circuit multiplexing technology makes it possible to share antennas with the same frequency without deteriorating the noise figure of the link, which effectively reduces the layout size of 4G and 5G multimode products, simplifies the RF circuit design and the antenna design and improves the user experience.

Embodiment III

Figure 5:
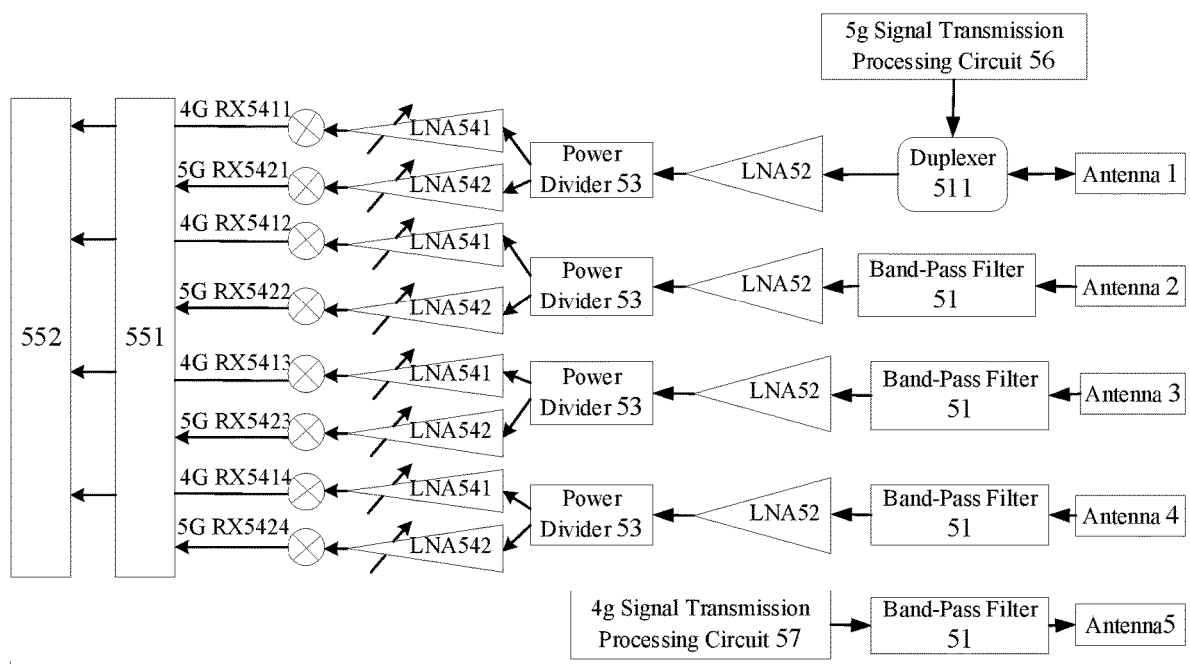
FIG. 5 is a schematic diagram of a communication circuit according to embodiment III of the present disclosure.

According to another example of the embodiment of the present disclosure, a communication circuit applicable to the FDD system is provided, as shown in FIG. 5. The communication circuit includes four groups of signal reception multiplexing circuits, which include multiplexing antennas 1, 2, 3 and 4. The communication circuit also includes a transmission antenna 5 and a 4G signal transmission processing circuit 57 connected to the transmission antenna, where the transmission antenna is a transmission antenna for 4G signal and is configured to transmit 4G signals separately. The antennas 1, 2, 3 and 4 are configured to receive 5G signals and a second signal having the same frequency band sent by the base station, where the second signal includes at least one of 2G, 3G and 4G signals. In FIG. 5, the second signal being a 4G signal is taken as an example. The antenna 1 is also connected to a 5G signal transmission processing circuit 56 and a duplexer 511 and is configured to transmit 5G signal. When band-pass filters connected to the antennas 2, 3 and 4 are replaced with duplexers, the 5G transmission signals can also be switched among the antennas 1, 2, 3 and 4, so the 5G transmission signals are not limited to the antenna 1. The 5G and 4G signals received by the antennas 1-4 are filtered by the band-pass filter 51 and the duplexer 511, and then enter a low noise pre-amplifier 52 for pre-amplification, so as to amplify the weak signals received by antennas, provide appropriate gain and reduce the influence of post-stage power divider 53 on the signal-to-noise ratio of the signal path. The low noise pre-amplifier shall be a low noise amplifier with low noise figure (nf<1.0), high linearity and medium gain (gain 10~12 dB). The pre-amplified 4G and 5G received signals are separated from the received signals by the power divider 53, then distributed to the respective 4G signal adjustable gain amplifier 541 and 5G signal adjustable gain amplifier 542 for signal adjustable gain amplification, and then sent to a 4G signal demodulation module 551 and a 5G signal demodulation module 552 for signal demodulation processing after the signal amplitudes of 4G signal and 5G signal reach specific amplitudes.

According to the embodiment of the present disclosure, the communication circuit includes at least one signal reception multiplexing circuit which includes a multiplexing antenna, a signal separation module connected to the multiplexing antenna, and a first signal demodulation module and a second signal demodulation module respectively connected to the signal separation module. The multiplexing antenna is configured to receive a first signal and a second signal having the same frequency band and send the received signals to the signal separation module. The signal separation module is configured to separate the first signal and the second signal from the received signal, send the separated first signal to the first signal demodulation module for demodulation processing, and send the separated second signal to the second signal demodulation module for demodulation processing. According to the embodiment of the present disclosure, the communication circuit integrates the receiving circuits and antennas for the 4G and 5G signals of the same frequency band, allowing the downlink signals of 4G and 5G to share the antenna receiving and receiving amplification circuits, which solves the problems of crowded antenna space and larger circuit occupation area in the terminal device, reduces the number of 4G 4×4MIMO+ 5G4×4MIMO antennas from 8 to 5, greatly reduces the pressure of antenna layout, and reduces the number of antennas to help improve antenna performance. Using circuit multiplexing technology makes it possible to share antennas with the same frequency without deteriorating the noise figure of the link, which effectively reduces the layout size of 4G and 5G multimode products, simplifies the RF circuit design and antenna design and improves the user experience.

Embodiment IV

Figure 6:
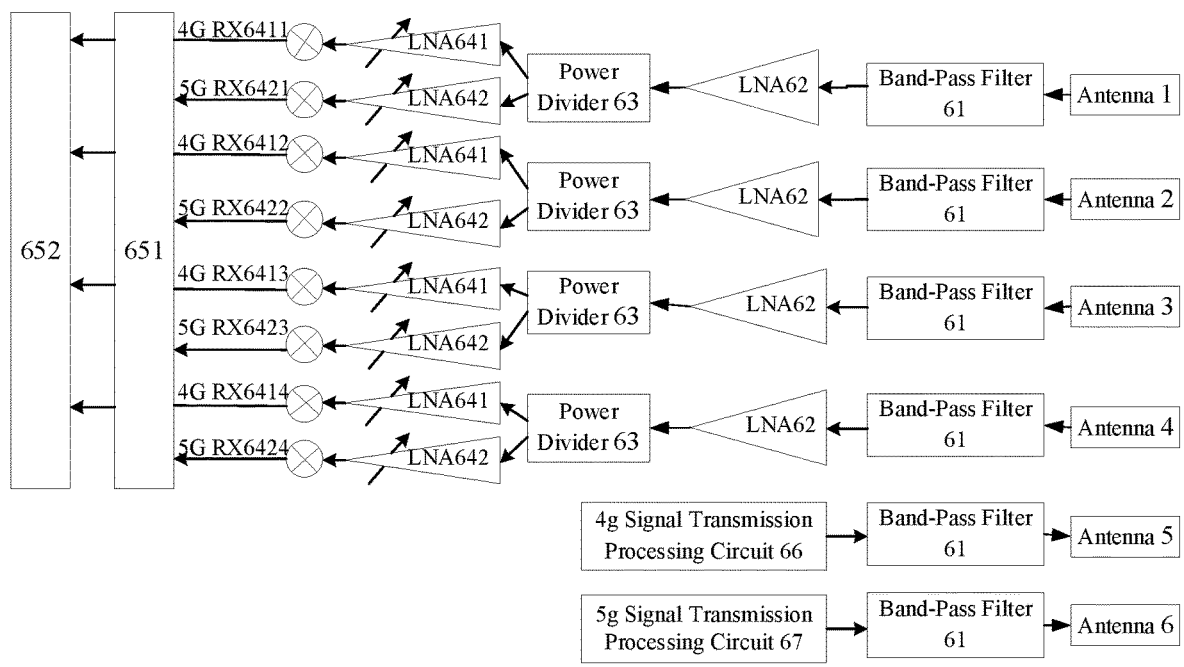
FIG. 6 is a structural diagram of a communication circuit according to embodiment IV of the present disclosure.

According to another example of the embodiment of the present disclosure, a communication circuit applicable to the FDD system and a TDD system is provided, as shown in FIG. 6. The communication circuit includes four groups of signal reception multiplexing circuits, which include multiplexing antennas 1, 2, 3 and 4. The communication circuit also includes a transmission antenna 5, a transmission antenna 6, a 4G signal transmission processing circuit 66 connected to the transmission antenna 5, and a 5G signal transmission processing circuit 67 connected to the transmission antenna 6, where the transmission antenna 5 is a transmission antenna for 4G signal and is configured to transmit 4G signals separately; and the transmission antenna 6 is a transmission antenna for 5G signal and is configured to transmit 5G signals separately. The antennas 1, 2, 3 and 4 are configured to receive 5G signals and a second signal having the same frequency band sent by the base station, where the second signal includes at least one of 2G, 3G and 4G signals. In FIG. 6, the second signal being a 4G signal is taken as an example. The 5G and 4G signals received by the antennas 1-4 are filtered by the band-pass filter 61, and then enter a low noise pre-amplifier 62 for pre-amplification, so as to amplify the weak signals received by antennas, provide appropriate gain and reduce the influence of post-stage power divider 63 on the signal-to-noise ratio of the signal path. The low noise pre-amplifier shall be a low noise amplifier with low noise figure (nf<1.0), high linearity and medium gain (gain 10~12 dB). The pre-amplified 4G/5G received signals are separated from the received signals by the power divider 63, then distributed to the respective 4G signal adjustable gain amplifier 641 and 5G signal adjustable gain amplifier 642 for signal adjustable gain amplification, and then sent to a 4G signal demodulation module 651 and a 5G signal demodulation module 652 for signal demodulation processing after the signal amplitudes of 4G signal and 5G signal reach specific amplitudes.

According to an embodiment of the present disclosure, a communication device is also provided, which includes the communication circuit described in the above embodiments.

In an embodiment of the present disclosure, the communication device may be a user device or a base station.

According to the embodiment of the present disclosure, the communication circuit includes at least one signal reception multiplexing circuit which includes a multiplexing antenna, a signal separation module connected to the multiplexing antenna, and a first signal demodulation module and a second signal demodulation module respectively connected to the signal separation module. The multiplexing antenna is configured to receive a first signal and a second signal having the same frequency band and send the received signals to the signal separation module. The signal separation module is configured to separate the first signal and the second signal from the received signal, send the separated first signal to the first signal demodulation module for demodulation processing, and send the separated second signal to the second signal demodulation module for demodulation processing. According to the embodiment of the present disclosure, the communication circuit integrates the receiving circuits and antennas for the 4G and 5G signals of the same frequency band, allowing the downlink signals of 4G and 5G to share the antenna receiving and receiving amplification circuits, which solves the problems of crowded antenna space and larger circuit occupation area in the terminal, reduces the number of 4G 4×4MIMO+5G 4×4MIMO antennas from 8 to 6, greatly reduces the pressure of antenna layout, and reduces the number of antennas to help improve antenna performance. Using circuit multiplexing technology makes it possible to share antennas with the same frequency without deteriorating the noise figure of the link, which effectively reduces the layout size of 4G and 5G multimode products, simplifies the RF circuit design and antenna design and improves the user experience.

All or some of the steps in the methods, systems, and functional modules/units in the devices disclosed above may be implemented as software (which may be implemented with computer program code executable by the computing device), firmware, hardware and appropriate combinations thereof. In the hardware implementation, the division between functional modules/units mentioned in the above description does not necessarily correspond to the division of physical components. For example, a physical component may have multiple functions, or a function or step may be cooperatively performed by multiple physical components. Some or all of the physical components may be implemented as software executed by a processor, such as a central processing unit, a digital signal processor or a microprocessor, or as hardware, or as an integrated circuit, such as an application specific integrated circuit.

Communication medium typically contains computer-readable instructions, data structures, computer program modules, or other data in modulated data signals such as carriers or other transmission mechanisms, and may include any information delivery medium. Therefore, the present disclosure is not limited to any specific combination of hardware and software.

What is claimed is:

1. A communication circuit, comprising a signal reception multiplexing circuit, the signal reception multiplexing circuit comprising:
   a multiplexing antenna;
   a signal separation module connected to the multiplexing antenna;
   a filter processing module arranged between the multiplexing antenna and the signal separation module, and the filter processing module being configured to filter the signals received by the multiplexing antenna and send the signals to the signal separation module; and
   a first signal demodulation module and a second signal demodulation module respectively connected to the signal separation module;
   the multiplexing antenna being configured to receive a first signal and a second signal of the same frequency band and to send the signals received to the signal separation module, wherein the first signal is a 5G signal, and the second signal is at least one of 2G signal, 3G signal or 4G signal; and
   the signal separation module being configured to separate the first signal and the second signal from the signals received, to send the first signal separated to the first signal demodulation module for demodulation processing, and to send the second signal separated to the second signal demodulation module for demodulation processing.

2. The communication circuit of claim 1, wherein the signal reception multiplexing circuit further comprises a low noise processing module arranged between the filter processing module and the signal separation module, and the low noise processing module is configured to amplify the signals filtered by the filter processing module.

3. The communication circuit of claim 1, wherein the signal reception multiplexing circuit further comprises a first signal amplification processing module arranged between the signal separation module and the first signal demodulation module, and a second signal amplification processing module arranged between the signal separation module and the second signal demodulation module.

4. The communication circuit of claim 1, further comprising a transmission antenna and a signal transmission processing circuit connected to the transmission antenna.

5. The communication circuit of claim 4, wherein the transmission antenna comprises a first signal transmission antenna and a second signal transmission antenna, and the signal transmission processing circuit comprises a first signal transmission processing circuit and a second signal transmission processing circuit, and wherein the first signal transmission antenna is connected to the first signal transmission processing circuit and the second signal transmission antenna is connected to the second signal transmission processing circuit.

6. The communication circuit of claim 1, wherein the signal reception multiplexing circuit comprises multiple signal reception multiplexing circuits, and a multiplexing antenna in at least one of the multiple signal reception multiplexing circuits is connected to a signal transmission processing circuit and a duplexer, and wherein the signal transmission processing circuit is connected to the multiplexing antenna through the duplexer, and the signal separation module is connected to the multiplexing antenna through the duplexer; and the multiplexing antenna is further configured to receive a first signal or a second signal generated by the signal transmission processing circuit and transmit the first signal or second signal received.

7. The communication circuit of claim 6, wherein, when multiplexing antennas in two of the multiple signal reception multiplexing circuit are connected to signal transmission processing circuits and duplexers, one signal transmission processing circuit is a first signal transmission processing circuit, and the other signal transmission processing circuit is a second signal transmission processing circuit.

8. The communication circuit of claim 6, wherein, when a multiplexing antenna in one of the multiple signal reception multiplexing circuits is connected to a signal transmission processing circuit and a duplexer, the signal transmission processing circuit is a first signal transmission processing circuit;

the communication circuit further comprises a transmission antenna and a signal transmission processing circuit connected to the transmission antenna, wherein the signal transmission processing circuit connected to the transmission antenna is a second signal transmission processing circuit.

9. The communication circuit of claim 1, wherein the first signal is a 5G signal and the second signal is a 4G signal.

10. A communication device, comprising a communication circuit, wherein the communication circuit comprises a signal reception multiplexing circuit, and the signal reception multiplexing circuit comprises:

a multiplexing antenna;

a signal separation module connected to the multiplexing antenna;

a filter processing module arranged between the multiplexing antenna and the signal separation module, and the filter processing module being configured to filter the signals received by the multiplexing antenna and send the signals to the signal separation module; and a first signal demodulation module and a second signal demodulation module respectively connected to the signal separation module;

the multiplexing antenna being configured to receive a first signal and a second signal of the same frequency band and to send the signals received to the signal separation module, wherein the first signal is a 5G signal, and the second signal is at least one of 2G signal, 3G signal or 4G signal; and the signal separation module being configured to separate the first signal and the second signal from the signals received, to send the first signal separated to the first signal demodulation module for demodulation processing, and to send the second signal separated to the second signal demodulation module for demodulation processing.

11. The communication device of claim 10, wherein the communication device is a user device or a base station.

* * * * *